June 26, 1945.　　　O. V. TEEGARDEN　　　2,378,955
TIRE TOOL
Filed Sept. 21, 1943　　　2 Sheets-Sheet 1
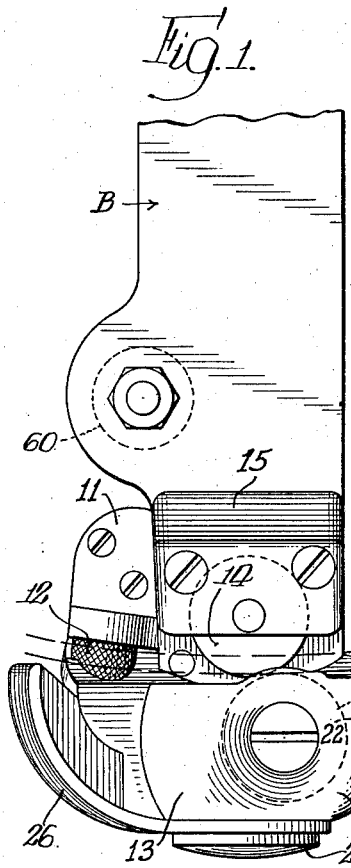
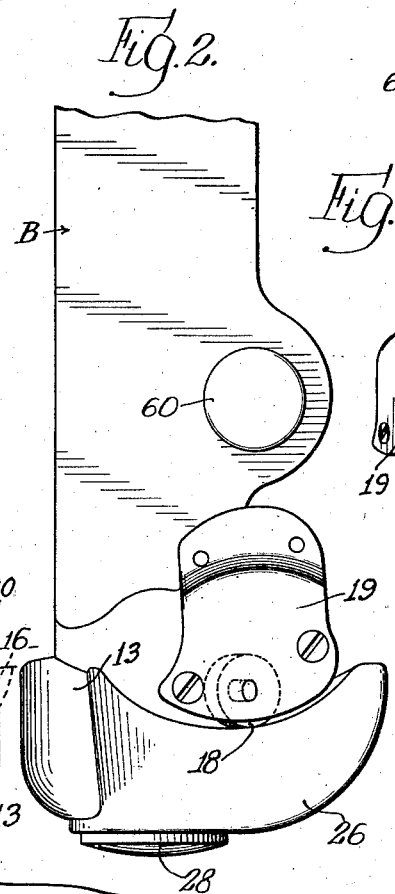
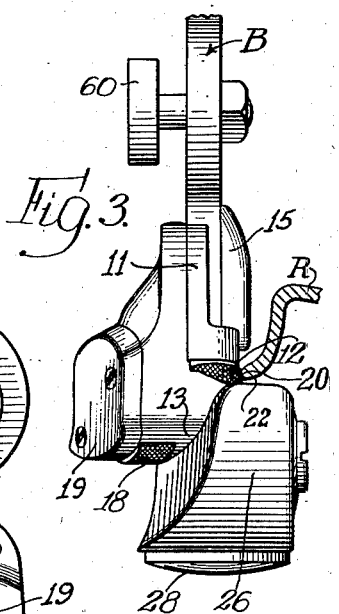
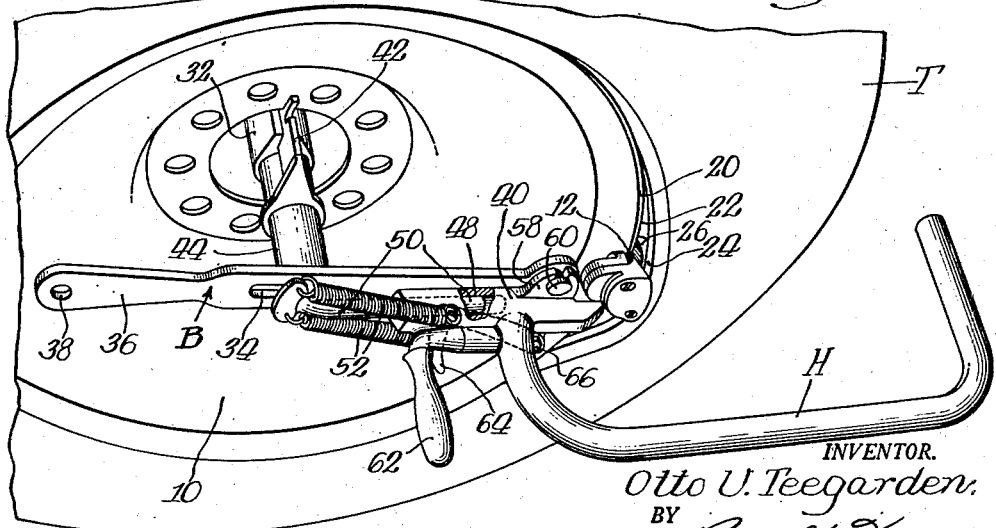
INVENTOR.
Otto U. Teegarden
BY
Bair & Freeman
Attys.

June 26, 1945.  O. V. TEEGARDEN  2,378,955
TIRE TOOL
Filed Sept. 21, 1943  2 Sheets-Sheet 2
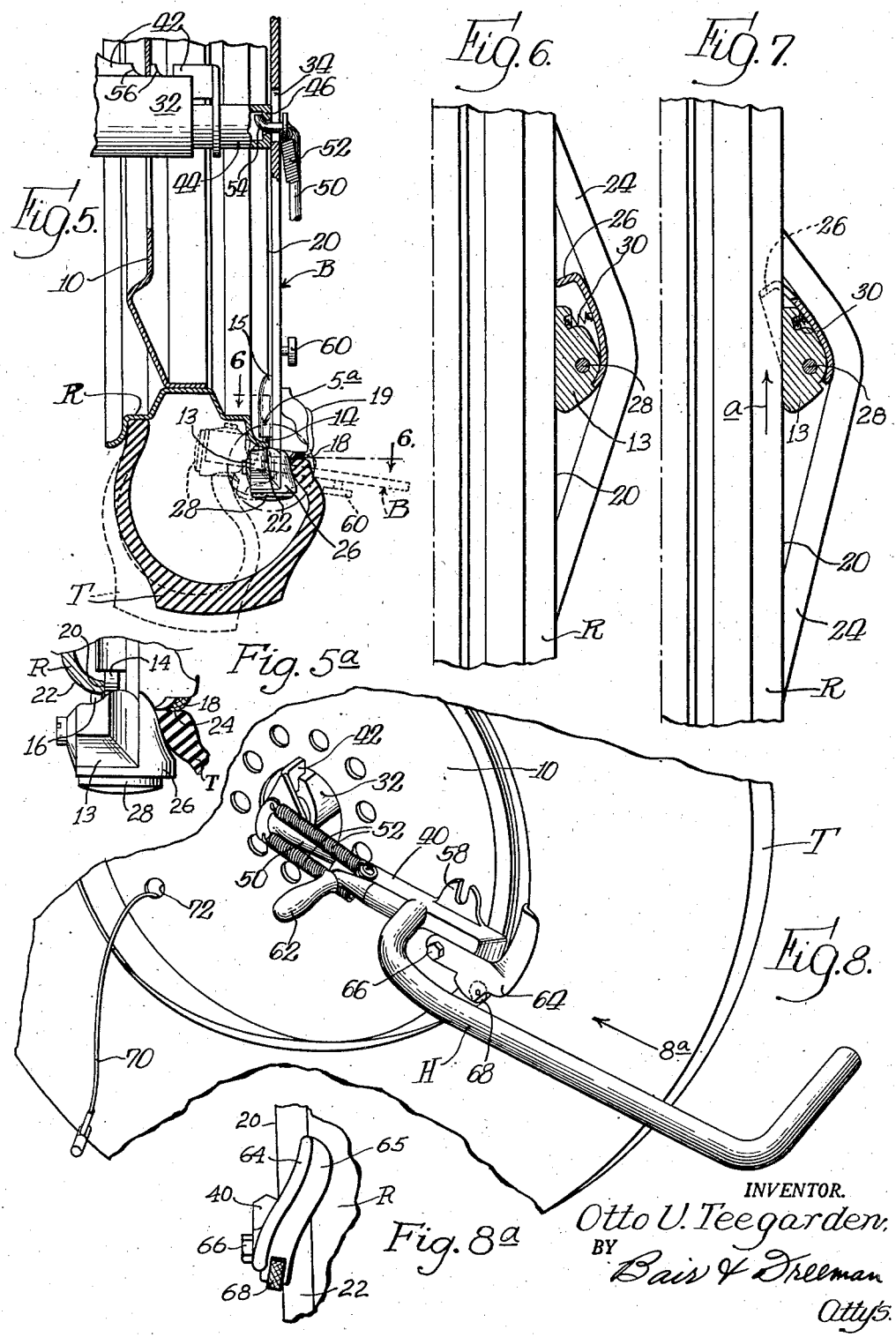
INVENTOR.
Otto U. Teegarden,
BY Bair & Freeman
Attys.

Patented June 26, 1945

2,378,955

UNITED STATES PATENT OFFICE 2,378,955

TIRE TOOL

Otto V. Teegarden, Goshen, Ind.

Application September 21, 1943, Serial No. 503,174

7 Claims. (Cl. 157—6)

My present invention relates to a tire tool particularly designed for use in connection with a tire handling stand of the kind shown in my copending application Serial No. 492,684, filed June 29, 1943.

One object of the invention is to provide a tire tool which may be utilized to remove a tire from the rim and to also replace the tire on the rim by means of bead engaging shoes carried by the tool to facilitate such removal and replacing of one bead of the tire with a minimum of effort and operations.

Another object is to provide a tire tool designed with two separate shoes, one for removing a tire bead from a rim and the other for replacing it, the two shoes being so associated as to prevent the interference of one with the other during the separate tire removing and replacing operations.

A further object is to provide a tire tool which is adjustable to various sizes of tires and which is rigidly supported for rotation at its center by coacting with a supporting member such as shown at 44 and 46 in my copending application whereby the handle of the tire tool may be rotated around the outside of the tire to either perform the tire removing or the tire replacing operation.

Further objects are to provide details of construction of the tire tool which facilitate its operation, such as rollers for rolling on the rim and on the bead of the tire and pivoting of the bead removing shoe to minimize friction due to drag of the shoe on the tire bead during the removing operation.

With these and other objects in view, my invention consists in the construction, arrangement and combination of the various parts of my tire tool, whereby the objects contemplated are attained, as hereinafter more fully pointed out, set forth in my claims, and illustrated in the accompanying drawings, in which:

Figure 1 is an elevation of a head of the tire removing portion of my tire tool to show the construction thereof.

Figure 2 is an elevation of the reverse side of Figure 1.

Figure 3 is a front elevation as looking in the direction of the arrow 3 adjacent Figure 2.

Figure 4 is a perspective view of the complete tire tool associated with a wheel and rim supporting means of my copending application, and with a tire on the rim; the start of the tire removing operation being illustrated.

Figure 5 is a sectional view through a rim, a tire and a portion of my tire tool showing initial positions of the tire tool for the tire removing operation.

Figure 5a is an enlargement of the portion of Figure 5 within the circle 5a.

Figure 6 is a sectional view on the line 6—6 of Figure 5 showing a portion of the rim in plan view and illustrating how a tire bead engaging shoe is positioned in relation to the bead of the tire.

Figure 7 is a similar view showing the position of parts of the tire tool after the tool has been swung part way in its rotation around the tire during the tire removing operation.

Figure 8 is a perspective view showing the tire tool adjusted for replacing the tire on the rim, and Figure 8a is an end elevation of the head 40 and shoe 64 of Figure 8 looking in the direction of the arrow 8a.

On the accompanying drawings I have used the reference numeral 44 to indicate a tube of a center post 32 shown in my copending application. The tube 44 is telescopically mounted in the post 32 for adjustment purposes and has an inturned flange 46 on its outer end all as fully explained in said application.

The center post 32 is adapted to support a rim R having a tire T thereon as by coaction of the disc 10 of the wheel with one of the notches 56 of a flange 42 of the center post 32. The tube 44 is thereby positioned adjacent the center of the rim and tire.

My present tire tool comprises two parts which may be referred to generally as a bar B and a handle H. The bar B has a head 13 thereon shown in detail in Figures 1, 2 and 3, and including rim engaging rollers 12, 14 and 16, and a bead engaging roller 18. The roller 12 is carried by a bracket 11 and the rollers 14 and 18 are held in mounted position by brackets 15 and 19. The rollers 12 and 14 are adapted to engage the outer edge of the rim R, said outer edge being indicated at 20 in Figures 5, 5a, 6 and 7, and by dotted lines in Figure 1. The roller 16 is adapted to engage the peripheral edge 22 of the rim (see Figures 4, 5 and 5a). The bead engaging roller 18 is adapted to engage the internal edge 24 of the bead of the tire T during operation of the tool as will hereinafter appear.

The head 13 of the bar B also carries a bead removing shoe 26 which is pivoted on a substantially radial stud 28 and is normally constrained toward movement to the position of Figure 6 by a spring 30 inside the shoe. The bar B is slotted as indicated at 34 and has a handle portion 36 for convenience in manipulating the bar. The handle portion has a perforation 38 for hanging the bar on a suitable supporting hook when not in use.

The handle H has an elongated body 40 thereon which is provided with a bore in which a handle extension 50 is slidably mounted. The extension 50 is constrained toward its inner limit of telescoping movement by a pair of springs 52 and terminates in a hook-like end 54 for passage through the slot 34 and coaction with the flange 46 as shown in Figure 5.

The body 40 has a bifurcated lug 58 adapted to coact with a headed stud 60 of the bar B during part of the operation as illustrated in Figure 4. The handle H has also an auxiliary handle 62 for convenience in handling the tire tool and manipulating it for tire removing and replacing operations.

There is a tire bead replacing shoe 64 pivoted to the handle body 40, the purpose of which will hereinafter appear.

Practical operation

In the operation of my tire tool, after the rim and tire have been supported on the tire stand of my copending application and the tire loosened from the rim, by mechanism supported by said stand, the head 18 of the bar B may be inserted between the lower part of the rim and the adjacent tire bead as shown by dotted lines in Figure 5. The inner tube has not been shown, but of course would be in the tire casing and would be completely deflated so as to facilitate this operation. The head 18 of the bar B is merely placed against the tire and pushed inwardly close to the rim and will, after spreading the bead from the rim, slip into the space between them as shown by the dotted lines. The head of the bar B being somewhat enlarged, hooks inside the bead and the bar may be swung up to the full line position against the tube 44. The handle H may then be connected as in Figure 4, by first inserting the hook end 54 through the slot 34 of the bar B and then inside the flange 46. The handle H is then swung downwardly and the bifurcated lug 58 is engaged with the headed stud 60.

During this operation, the slot 34 serves as an adjustment for different sizes of tires and the handle H may be pulled downwardly against the action of the springs 52 for adjusting the handle from its minimum diameter position to the proper size of the tire being removed from the rim. The parts are now in the position of Figure 4, the head 18 of the bar B, however, extending downwardly from the tube 44 instead of sidewise from it for convenience in starting the tire removing operation. It has been shown in the position of Figure 4 to fit in the space available on the drawings.

The outer end of the handle H may now be grasped and the handle rotated counter-clockwise, which will cause the bead removing shoe 26 to "plough" the bead from the rim and permit it to spring over outside of the rim so that after about 200° of rotation of the handle, the tire will be sufficiently removed from the rim that it can be taken off the rest of the way by hand without any difficulty whatever. When speaking of removal, I of course mean the outer bead of the rim. For most tube repair operations it is not necessary to remove the inner bead as described in my copending application. If it is necessary, it can be readily done by hand without requiring special tools.

Before the bar B is started in its counter-clockwise rotation, the bead 24 of the tire will be bowed outwardly from the rim as shown. After some upward movement, (arrow a) the bead, as shown in Figure 7 will assume at the front of the shoe 26, a sharper angle caused by in drag on the shoe. The shoe is pivoted for the purpose of permitting it to swing as from the position shown in Fig. 6 to the position shown in Figure 7 as caused by the sharper angle of the bead and thus aid in the bead removing operation without increasing the drag to a prohibitive extent. During the removing operation, the bead engaging roller 18 also helps in reducing friction.

When it is desirable to replace the bead on the rim it can be put on about one-third of the way around the rim by hand, and then the handle H used alone as in Figure 8 for "ploughing" the bead back on the rim. For this purpose the bead replacing shoe is shaped so as to transfer the engaged portion of the bead from a position outside the rim to a position inside so that when it leaves the shoe it is in its proper position (see Fig. 8a), a flange 65 of the shoe riding the periphery of the tire rim under constraint of the springs 52. The handle H is then rotated until the entire bead is back on the rim.

During the tire replacing operation, the valve of the inner tube may be kept from getting away from the operator by a flexible cord 70 extending through the tire valve opening 72 of the rim R and screwed onto the tire valve in an obvious manner.

Having described my tire tool, it is believed obvious how it may cooperate with the tire handling stand of my previous application or with any means at the center of the rim for supporting the tire tool for rotation. For instance, the hooked end 54 may be designed for direct coaction in the opening of the wheel disc 10 and the tire tool thereby used on a rim and tire lying on the floor. Although I have described rollers in connection with the tire tool for engaging the rim and bead, they are not absolutely essential and can be dispensed with if a cheaper type of tool is to be manufactured. They do, however, considerably reduce friction and therefore reduce the manual effort necessary for operating the tire tool. The tool is arranged in two parts to facilitate operation and the parts are so associated and so cooperate with the center post 32 or other support at this point that the tool is instantly adjustable to different sizes of tires.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a tire tool for use with a supporting means positioned at the center of a rim on which a tire is mounted, a bar having a head thereon, said head having rim rollers engaging the outer side and the periphery of the rim, a tire bead roller and a bead removing shoe carried by said head, said shoe being pivotally mounted and spring biased laterally of said bar, and a detachable handle for operating said bar, said handle having a telescopic extension terminating in an element for pivotal and rotating cooperation with said supporting means, said bar being slotted and said pivot element extending through the slot thereof and interengaging with said supporting means, said handle and bar having another detachable connection for swinging the bar in spoke-like rotation about said supporting means by manipulating the handle.

2. A tire tool for use in connection with a center post comprising a bar having a head on one end thereof, said head having rollers for travel along the outer edge of a tire rim, and a tire removing shoe and a roller for travel on the tire bead, said shoe being pivoted on a substantially radial pivot, said head being engageable with a tire bead adjacent the rim when said bar is in a position normal to the plane of the tire after the bead is loosened from the rim and adapted to push the bead away from the rim to permit insertion of said head between the bead and rim, said bar being then swingable to a position substantially parallel to said plane with one portion thereof overlying the end of said center post to lift the tire at one point out of the rim, means for rotatably retaining said bar on said center post, and means for rotating it about said post for successively removing the tire from other points around the rim with said last roller rolling against the bead of the tire, said shoe effecting removal of the tire from the rim by lateral swinging of the shoe on its pivot due to the drag of the bead thereon whereby the shoe aids in effecting such removal.

3. In a tire tool for use with a center post on which the tire is mounted, a bar rotatably engaged with said center post and having a head thereon, a bead removing shoe carried thereby, said shoe being pivotally mounted on a radial axis on said head, and a handle for said bar having an element for pivotal and rotating cooperation with said center post, said handle and bar having a two-point detachable connection with each other for rotating the bar about said center post in unison with said handle when the handle is rotated.

4. A tire tool comprising a bar having a head, rollers carried by said head for travel along a tire rim, two along the outer side and one along the periphery thereof, and a pivoted tire removing shoe and a roller for travel on said tire bead, said head being engageable with a tire bead adjacent the rim when said bar is in a position normal to the plane of the tire and adapted to be used to push the bead after it has been loosened from the rim to a position spaced from the rim, permitting insertion of said head to a position between said bead and rim, said bar being thereafter swingable to a position parallel to said plane to lift the tire at one point out of the rim, and means for rotating the bar about the center of the rim for successively removing the tire from other points of the rim.

5. A tire tool for use with a supporting element at the axis of a tire rim comprising a bar having a head on one end thereof, a handle for said bar having an elongated body, said body having a telescopic extension for pivotal and rotating coaction with said supporting element, spring means biasing said body and extension toward their shortest limit of telescopic movement, said head being engageable with a tire bead adjacent the rim when said bar is in a position normal to the plane of the tire and adapted to be used to push the bead after it has been loosened from the rim to a position spaced from the rim, permitting insertion of said head to a position between said bead and rim, said bar being thereafter swingable to a position parallel to said plane to lift the tire at one point out of the rim, connecting means between said bar and said handle, a portion of said telescopic extension passing through a longitudinal slot in said bar and engaging said supporting element, thereby providing means for rotating the bar about said axis for successively removing the tire from other points around the rim, said head being held in engagement with said rim by said spring means.

6. A tire tool comprising a bar having a radially pivoted tire removing shoe and a roller for traveling on a tire bead, said bar being adapted for one end thereof to engage a tire bead adjacent a rim when said bar is in a position normal to the plane of the tire whereby said end may be used to space said bead from said rim after the bead is loosened from the rim and thereby permit said end to be positioned between the bead and rim, said bar being thereafter swingable to a position parallel to said plane to lift the bead of the tire at one point out of the rim, and means for rotatably pivoting said bar at the center of the rim whereby rotation of the bar removes the bead from other points of the rim, said shoe being swung laterally on its pivot by the drag of the bead thereagainst.

7. In a tire tool for use with supporting means positioned at the center of a rim on which the tire is mounted, a bar having a head thereon, said head having a tire removing shoe pivotally mounted thereon for swinging on a radial axis, and a handle for said bar having a telescopic extension terminating in an element for pivotal and rotating cooperation with said supporting means, said bar being slotted and said pivot element extending through the slot thereof whereby said bar may be rotated about said center post, said handle and bar having a two-point detachable connection with each other for rotating the bar about said center post in unison with said handle when it is rotated.

OTTO V. TEEGARDEN.